United States Patent
Lagadec et al.

(10) Patent No.: US 9,227,740 B2
(45) Date of Patent: Jan. 5, 2016

(54) DEVICE FOR MONITORING THE ATTITUDE OF A SATELLITE, AND METHOD FOR CONTROLLING A SATELLITE PROVIDED WITH SAID DEVICE

(75) Inventors: Kristen Lagadec, Centres (FR); Thomas Chabot, Toulouse (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 227 days.

(21) Appl. No.: 13/980,667

(22) PCT Filed: Jan. 25, 2012

(86) PCT No.: PCT/EP2012/051121
§ 371 (c)(1),
(2), (4) Date: Jul. 19, 2013

(87) PCT Pub. No.: WO2012/101162
PCT Pub. Date: Aug. 2, 2012

(65) Prior Publication Data
US 2013/0292518 A1 Nov. 7, 2013

(30) Foreign Application Priority Data
Jan. 25, 2011 (FR) ...................................... 11 00217

(51) Int. Cl.
*B64G 1/24* (2006.01)
*B64G 1/36* (2006.01)
*B64G 1/40* (2006.01)

(52) U.S. Cl.
CPC ........ *B64G 1/363* (2013.01); *B64G 1/24* (2013.01); *B64G 1/407* (2013.01)

(58) Field of Classification Search
CPC .......... B64G 1/407; B64G 1/24; B64G 1/443; B64G 1/44; B64G 2001/245
See application file for complete search history.

(56) References Cited

U.S. PATENT DOCUMENTS

| | | | |
|---|---|---|---|
| 5,133,518 A * | 7/1992 | Flament | 244/168 |
| 5,305,971 A | 4/1994 | Decanini | |
| 5,775,645 A * | 7/1998 | Yocum et al. | 244/168 |
| 6,102,336 A * | 8/2000 | Cande | 244/168 |
| 7,104,506 B1 * | 9/2006 | Goodzeit et al. | 244/168 |

(Continued)

FOREIGN PATENT DOCUMENTS

| | | |
|---|---|---|
| DE | 25 37 577 | 3/1977 |
| DE | 196 37 262 | 3/1997 |
| EP | 0 668 212 | 8/1995 |
| EP | 0 794 120 | 9/1997 |
| EP | 919463 A1 * | 6/1999 |

OTHER PUBLICATIONS

International Search Report dated Apr. 26, 2012; corresponding to PCT/EP2012/051121.

(Continued)

*Primary Examiner* — Tien Dinh
*Assistant Examiner* — Richard R Green
(74) *Attorney, Agent, or Firm* — Young & Thompson

(57) ABSTRACT

A device for controlling the attitude of a satellite exploiting solar pressure, includes at least two solar generators destined to be arranged on either side of a central body of the satellite and each having one face to be exposed to the Sun, referred to as "front face", the device also including at least three surfaces whose optical properties can be commanded. The surfaces whose optical properties can be commanded are arranged on flaps connected to solar generators, each flap being fixed with respect to the solar generator to which it is connected, and such that, in the operating position, at least two of the surfaces are not parallel when the front faces of the solar generators are optimally oriented with respect to the Sun. The device further includes a module for commanding the optical properties of each surface whose optical properties can be commanded.

17 Claims, 4 Drawing Sheets

(56) References Cited

U.S. PATENT DOCUMENTS

Figures 3A, 3B:
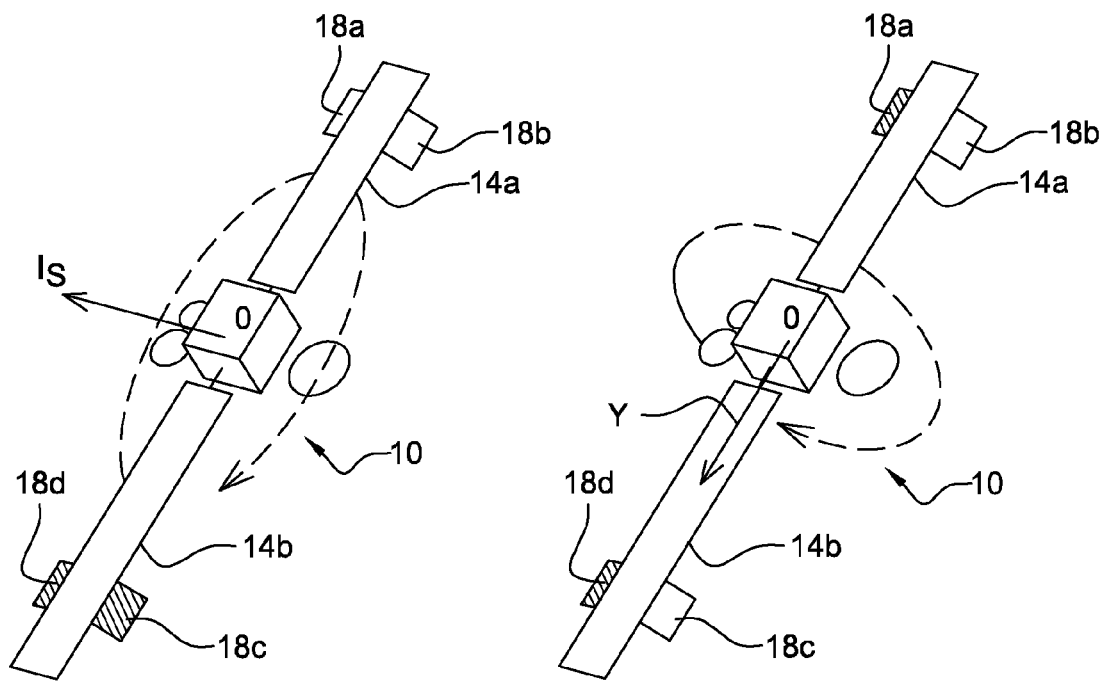

| | | | |
|---|---|---|---|
| 7,973,236 B2* | 7/2011 | Sinsabaugh | 136/246 |
| 7,980,514 B2* | 7/2011 | Wehner et al. | 244/168 |
| 8,547,669 B2* | 10/2013 | Larson et al. | 361/42 |
| 2006/0038080 A1* | 2/2006 | Polle | 244/168 |

OTHER PUBLICATIONS

Kyroudis; "Survey of Solar-Sailing Configurations for Satellite Attitude Control"; Paper American Astronautical Society; vol. 91-486; Jan. 1, 1991; pp. 815-838; XP000671524.

* cited by examiner

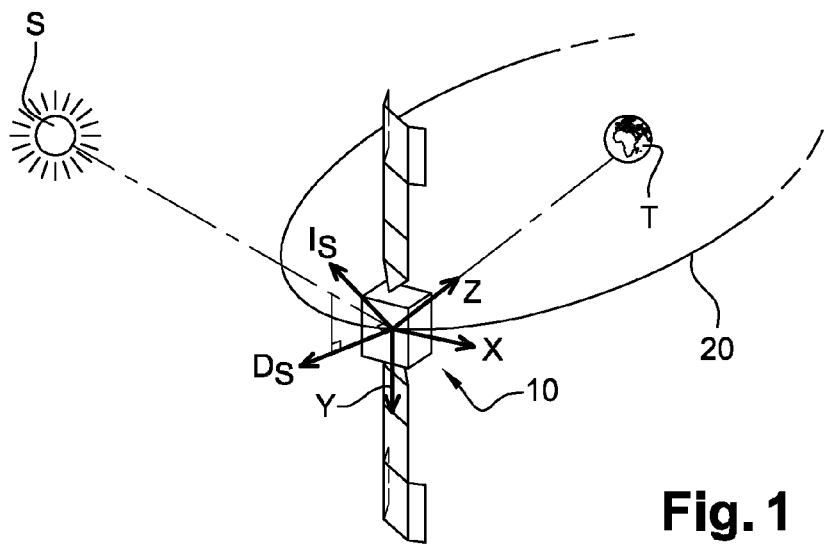
Fig. 1
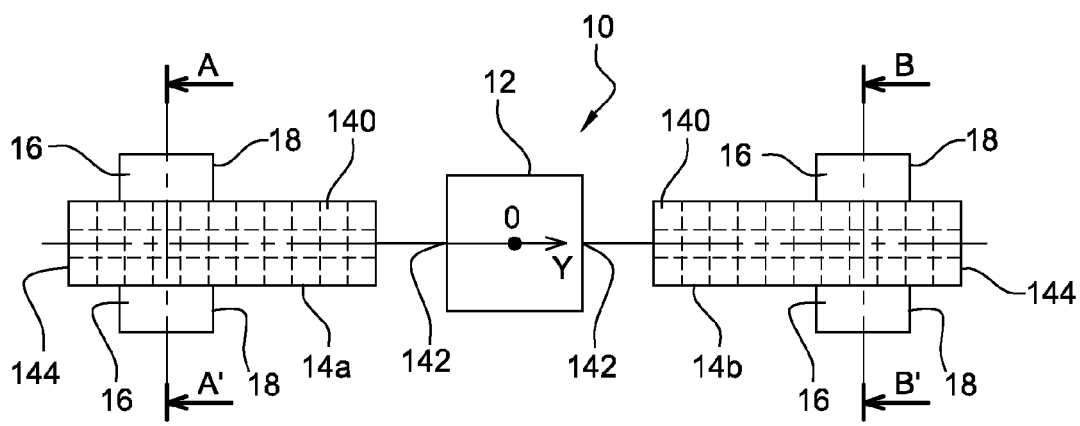
Fig. 2a
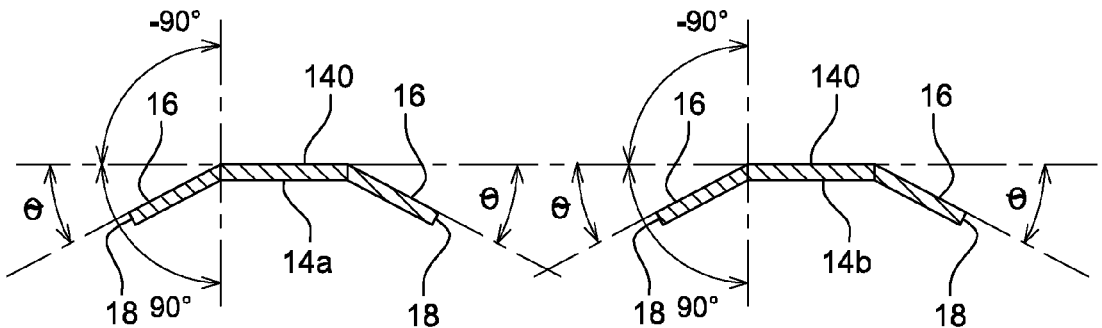
Fig. 2b  Fig. 2c

DEVICE FOR MONITORING THE ATTITUDE OF A SATELLITE, AND METHOD FOR CONTROLLING A SATELLITE PROVIDED WITH SAID DEVICE

The present invention belongs to the field of satellite's attitude control. More specifically, the present invention relates to a device for controlling the attitude of a satellite around three axes, by exploiting solar pressure, and a method for commanding a satellite equipped with such a device.

For satellites placed at a high altitude with respect to the Earth, solar pressure is one of the main sources of disturbing torques likely to lead to an undesirable change in the satellite's attitude. This is the case in particular for satellites placed in geosynchronous orbits (including in a geostationary orbit at an altitude of approximately 36 000 km), satellites placed at the Lagrange points, etc.

In order to control the attitude of such a satellite, it is known, in particular, to accumulate the angular momentum induced by these disturbing torques by means, for example, of reaction wheels. These reaction wheels accumulate the angular momentum by gradually increasing their rotation speed and must be regularly de-saturated, generally by means of chemical propellant thrusters, to reduce their rotation speeds.

It can be understood that such a solution has the drawback of resulting in extra consumption of propellants to de-saturate the reaction wheels.

For satellites comprising solar generators equipped with photovoltaic cells, destined to provide the electrical energy required for the satellite's payload to function, it is known to exploit the solar pressure by using said solar generators as a solar sail. In effect, it is possible to create torques by de-pointing the solar generators with respect to the Sun, torques that can be used to modify the satellite's attitude and/or to de-saturate the reaction wheels.

However, such a de-pointing of the solar generators causes a significant drop in the amount of electrical energy generated. It is therefore understood that de-pointing the solar generators is not very desirable.

It is also known, from U.S. Pat. No. 5,305,971, to equip solar generators with electrochromic cells. Such electrochromic cells are cells whose optical properties can be modified by applying an electrical stimulus. By modifying the optical properties of solar generators in this way, it is possible to modify the solar pressure each of the solar generators is subjected to and to create torques around two axes. However, in order to create torques around three independent axes and thus control the satellite's attitude around three axes by using the solar pressure, the proposed solution requires the solar generators to be de-pointed, causing a significant drop in the amount of electrical energy generated.

The present invention aims in particular to propose a device for controlling the attitude of a satellite exploiting solar pressure, which makes it possible to control the satellite's attitude around three different independent axes without needing to de-point the solar generators with respect to the Sun.

To this end, according to a first aspect, the present invention relates to a device for controlling the attitude of a satellite exploiting solar pressure, comprising at least two solar generators destined to be arranged on either side of a central body of the satellite and each having one face to be exposed to the Sun, referred to as "front face". The device further comprises at least three surfaces whose optical properties can be commanded, said surfaces being arranged:
on flaps connected to solar generators, each flap being destined to occupy a fixed position with respect to the solar generator to which it is connected, and such that at least two of said surfaces whose optical properties can be commanded are not parallel when the front faces of the solar generators are optimally oriented with respect to the Sun.

The device also comprises a command module adapted to command separately the optical properties of each surface whose optical properties can be commanded, such that torques around three independent axes can be created while the front faces of the solar generators are kept in their optimal orientation with respect to the Sun.

According to particular embodiments, the device comprises one or more of the following characteristics, considered either alone or in any technically possible combination:
the device comprises at least four flaps having substantially flat surfaces whose optical properties can be commanded, each of these surfaces being destined to have a constant inclination with respect to the front face of the solar generator to which it is connected;
the absolute value of the inclination, between each flap's surface whose optical properties can be commanded and the front face of the solar generator to which said flap is connected, is between 5° and 45°, preferably between 5° and 20°;
the flaps of one pair of a solar generator's flaps are destined to have substantially the same inclination with respect to said solar generator's front face;
at least one surface whose optical properties can be commanded comprises an electrochromic material, preferably an electrochromic material that can take at least two optical states;
at least one surface whose optical properties can be commanded comprises a network of several cells whose optical properties can be commanded, the command module being destined to command each cell whose optical properties can be commanded separately;
at least one surface whose optical properties can be commanded is realized with an element having static optical properties, the element with static optical properties comprising at least two areas with different static optical properties, and with means of mechanically modifying the respective proportion of each of the at least two areas with different static optical properties in the portion of the element with static optical properties that is exposed to the Sun's rays;
the element with static optical properties is a band, and the device comprises at least one roller whose rotation causes the scrolling of the band and the modification of the respective proportion of each of the at least two areas with different static optical properties in the portion of the band exposed to the Sun's rays.

According to a second aspect, the present invention relates to a satellite destined to be placed in geosynchronous orbit, comprising an attitude control device according to the invention.

According to a third aspect, the present invention relates to a method for commanding a satellite according to the invention, comprising the following steps:
determining an optimum orientation of the front faces of the solar generators with respect to the Sun,
orienting the front faces of the solar generators according to the optimum orientation,
determining a torque to be formed around three independent axes for controlling the attitude of the satellite,
commanding the optical properties of the surfaces whose optical properties can be commanded so as to form said attitude control torques while keeping the front faces of the solar generators in their optimum orientation.

Preferably, the optical properties of the surfaces are modulated over time so as to obtain an optical state corresponding to a weighted mean of the optical states available for said surfaces.

Figure 3C:
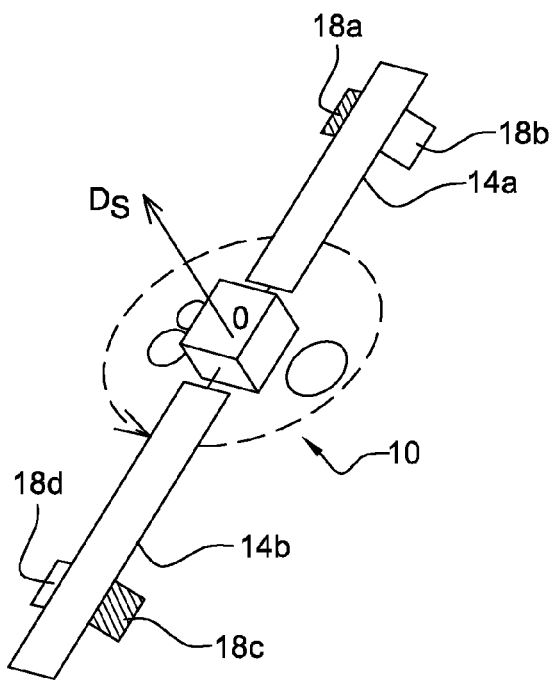
Figure 4A:
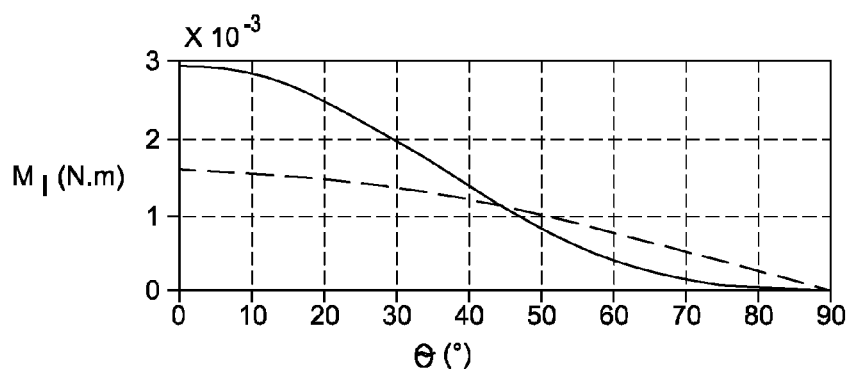
Figure 4B:
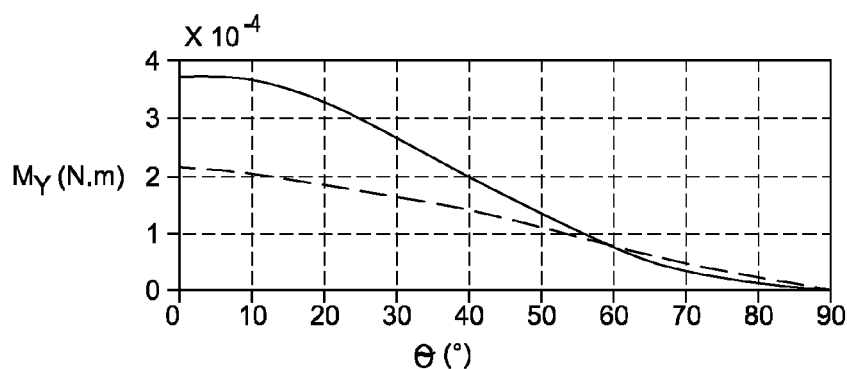
Figure 4C:
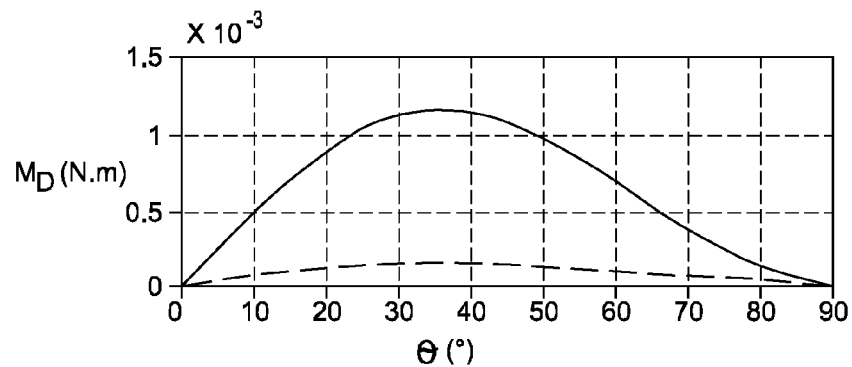
Figures 5A, 5B, 5C:
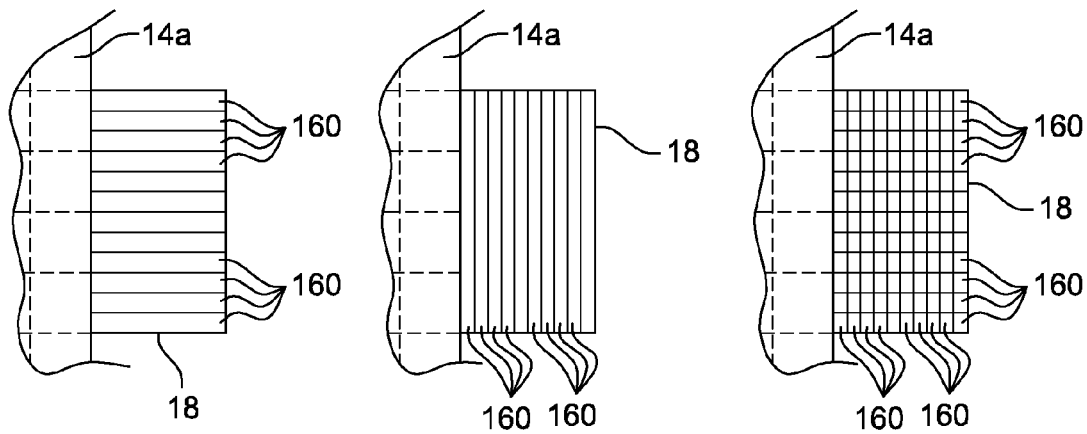
Figure 6A:
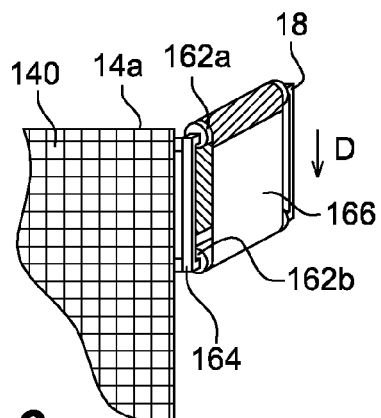
Figure 6B:
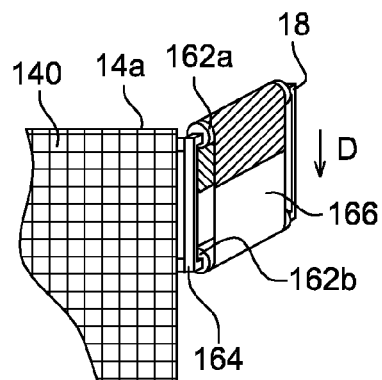
Figure 6C:
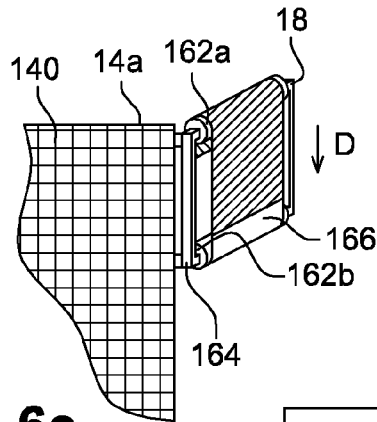
Figure 7:
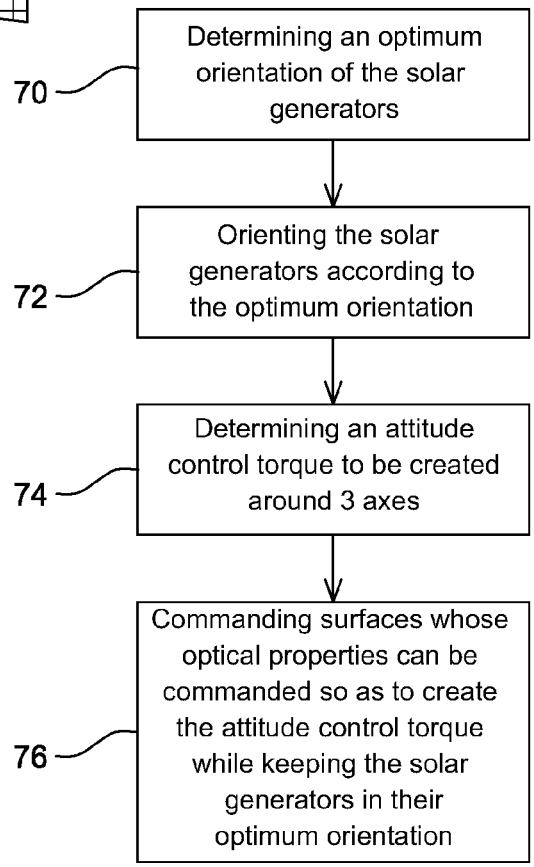

The invention will be better understood in reading the following description of a non-limiting example, made with reference to the figures, which represent:

FIG. 1: a schematic representation of a satellite in orbit equipped with an attitude control device according to the invention;

FIGS. 2a, 2b and 2c: schematic representations of a preferred embodiment of a device according to the invention;

FIGS. 3a, 3b and 3c: schematic representations illustrating the utilization of the device of FIG. 2a to form torques around three independent axes;

FIGS. 4a, 4b and 4c: graphs illustrating examples of maximum torques formed around three independent axes by utilizing a device of the type illustrated by FIG. 2a;

FIGS. 5a, 5b and 5c: schematic representations of embodiments of a variant of the device;

FIGS. 6a, 6b and 6c: schematic representations of another embodiment variant of the device;

FIG. 7: a diagram schematically representing the main steps of a method for commanding a satellite comprising an attitude control device according to the invention.

The present invention relates to a device for controlling the attitude of a satellite 10 around three axes, by exploiting solar pressure, and a method for commanding a satellite equipped with said device.

The present invention relates to satellites intended to be stationed in an area of space where the effects of solar pressure are not negligible. The invention relates in particular to satellites placed in a geosynchronous orbit (including in a geostationary orbit at an altitude of approximately 36 000 km), satellites placed at the Lagrange points, etc., for which solar radiation pressure is one of the most significant disturbing effects.

The remainder of the description considers, in a non-limiting way, the case of a satellite 10 placed in GEO.

FIG. 1 represents very schematically a satellite 10 stationed in GEO around the Earth T.

A reference frame is defined associated with the satellite 10, centered on the satellite's center of mass O, comprising three axes commonly called roll axis X, pitch axis Y and yaw axis Z. On station, the yaw axis Z is pointed towards the Earth T, the pitch axis Y is orthogonal to the GEO orbital plane, and the roll axis X completes the orthonormal basis and is oriented in the direction of the speed vector of the satellite 10.

An axis $D_S$ is also defined, corresponding to the projection of the satellite/Sun S direction on the (X, Z) plane, and an axis $I_S$, in the (X, Z) plane and orthogonal to the $D_S$ axis.

The satellite 10 comprises two solar generators, respectively 14a and 14b, arranged in the operating position on either side of a central body 12 of the satellite 10, extending substantially along a rotation axis of said solar generators.

"In the operating position" means the position said solar generators 14a, 14b are intended to occupy on the operational satellite, stationed in GEO.

Indeed, it is understood that said solar generators can occupy other positions before occupying their operating position. For example, the solar generators are generally constituted of panels that are folded in on themselves at launch, and are deployed once the satellite is stationed in GEO or in a transfer orbit. In this case, the operating position of the solar generators is their position after deployment.

For clarity purposes, the case is considered where the satellite 10 is controlled in attitude so as to keep the rotation axis of the solar generators 14a, 14b substantially perpendicular to the orbital plane. The Sun's rays therefore only have a substantially normal incidence on said solar generators at equinoxes.

Nothing precludes, according to other examples not detailed, from considering cases where the rotation axis can be inclined with respect to the normal to the orbital plane, for example to provide a normal incidence of the Sun's rays on said solar generators 14a and 14b, including at solstices.

Each solar generator 14a, 14b comprises a substantially flat face on which photovoltaic cells are arranged, referred to as "front face" 140. The front face 140 of each solar generator 14a, 14b is oriented towards the Sun to generate the electricity necessary for the payload of the satellite 10 to function. In the case where the rotation axis is kept substantially perpendicular to the orbital plane, the optimum orientation of the front faces of the solar generators is obtained by rotating the solar generators around the Y axis, where the $D_S$ axis is substantially orthogonal to said front faces 140.

The attitude control device of the satellite 10 also comprises at least three surfaces 16 whose optical properties can be commanded.

"Optical properties" mean the properties of transmission, absorption and reflection of light.

It is understood that, by modifying the optical properties of a surface whose optical properties can be commanded, it will be possible to modify the solar pressure on said surface. The surfaces whose optical properties can be commanded can be produced using different technologies, examples of which will be given later in the description.

The at least three surfaces 16 whose optical properties can be commanded are advantageously connected to the solar generators 14a, 14b. "Connected to the solar panel" means that a surface is borne by the solar generator or by an element itself borne by the solar generator.

The at least three surfaces 16 whose optical properties can be commanded are arranged, with respect to the solar generators 14a, 14b, such that, when the front faces 140 of said solar generators are oriented towards the Sun, said at least three surfaces whose optical properties can be commanded are exposed to the Sun's rays.

Further, the at least three surfaces 16 whose optical properties can be commanded are arranged such that at least two surfaces 16 whose optical properties can be commanded are not parallel when the front faces 140 of the solar generators, in relation to each other, are oriented optimally with respect to the Sun.

In the case of solar generators 14a, 14b that are mobile in rotation around a same axis substantially perpendicular to the orbital plane, the optimum orientation corresponds to front faces 140 substantially orthogonal to the direction $D_S$, and the at least three surfaces 16 whose optical properties can be commanded are arranged such that at least two of said surfaces are not parallel when the front faces 140 of the solar generators 14a, 14b are parallel.

It should be noted that the optimum orientation set point does not necessarily correspond to a normal incidence of the Sun's rays on the solar generators 14a, 14b.

Indeed, in order to obtain a substantially normal incidence of the Sun's rays on the solar generators, without inclining the satellite 10 with respect to the orbital plane, a mechanism with two rotation axes is required for each solar generator 14a, 14b. Considering solar generators 14a, 14b that are mobile in rotation around a single axis substantially perpendicular to the orbital plane, the optimum orientation corresponds to front faces 140 substantially orthogonal to the direction $D_S$, which is the projection of the satellite/Sun direction in the (X, Z) plane.

Arranging the surfaces 16 whose optical properties can be commanded on the solar generators 14a, 14b in this way ensures that said surfaces are suitable to allow the creation of torques around three independent axes (i.e. three linearly independent vector axes).

Preferably, each solar generator comprises at least one surface 16 whose optical properties can be commanded, and at least two surfaces 16 whose optical properties can be commanded are arranged on either side of the rotation axis of a solar generator 14a, 14b.

The device further comprises a command module (not shown in the figures) adapted to command separately the optical properties of each surface, so as to modify the forces induced by the solar pressure on said surfaces whose optical properties can be commanded. In this way, it is possible to create higher or lower torques around three independent axes, without having to de-point the solar generators 14a, 14b with respect to the Sun, solely by modifying the optical properties of the surfaces 16 whose optical properties can be commanded.

Preferably, the command module comprises at least one microprocessor and storage means (magnetic hard disk, flash memory, optical disk, etc.) in which a computer program product is stored, in the form of a set of program code instructions to be executed so as to implement the various steps of a method for controlling the attitude of the satellite 10. According to some embodiments, the command module also comprises one or more FPGA, PLD etc. types of programmable logic circuits, adapted to implement all or part of the steps of the method.

FIGS. 2a, 2b and 2c represent, schematically, a preferred embodiment of the attitude control device on a satellite 10.

More specifically, FIG. 2a represents the satellite 10, the solar generators 14a, 14b being seen at normal incidence, and FIGS. 2b and 2c represent cross-sections of the solar generators 14a and 14b, in cross-section planes A-A' and B-B' respectively, visible in FIG. 2a.

In this embodiment, the device comprises four surfaces 16 whose optical properties can be commanded, arranged respectively on four lateral flaps 18 connected mechanically to the solar generators 14a, 14b, each solar generator comprising a pair of flaps 18.

In the rest of the description, the non-limiting case is considered where a surface 16 whose optical properties can be commanded occupies an entire face of a flap 18. Nothing precludes, according to other examples not shown, said surface 16 whose optical properties can be commanded from occupying only one portion of a face of the flap 18.

Because of the flaps 18, the solar generators 14a, 14b can be equipped with surfaces whose optical properties can be commanded without affecting the area available for photovoltaic cells on each front face. In addition, by using flaps it is possible to position the surfaces 16 whose optical properties can be commanded farther from the rotation axis of the solar generator 14a, 14b to which these flaps are connected; as will be seen later, this tends to increase the capacity to create a torque around said rotation axis.

In addition, such flaps allow uncoupling the manufacturing of the flaps 18 and the manufacturing of the solar generators 14a, 14b. This is advantageous since the solar generators are sensitive elements that represent a significant proportion of the final cost of the satellite. Only the connections between the flaps 18 and the solar generators must be provided on the solar generators.

It should be noted that, in the operating position, such flaps 18 advantageously occupy a predefined fixed position with respect to the solar generators 14a, 14b to which they are connected.

As previously, the "operating position" of a flap means the position said flap is intended to occupy on the operational satellite 10, stationed in GEO. Indeed, it is understood that such a flap can occupy other positions before occupying its operating position. For example, in order to limit the launch volume such a flap will preferably be folded, and only deployed once the satellite is stationed in GEO or in a transfer orbit. In this case, the operating position of the flaps 18 is their position after deployment.

Because each flap is fixed in the operating position, i.e. each flap 18 is immobile with respect to the solar generator 14a, 14b to which it is connected, possibly after deployment, the connection between such a flap and a solar generator can be realized in a simple and robust way. A suitable connection is presented, for example, in the form of a hinge with a spring allowing the flap 18 to be deployed and kept immobile against a stop with a geometry destined to give the flap the desired inclination with respect to the front face 140 of the solar generator to which the flap is connected.

In the embodiment illustrated in FIGS. 2b and 2c, each flap 18 is substantially flat and, in the operating position, has a constant inclination with respect to the front face of the solar generator 14a, 14b to which said flap is connected.

A substantially flat flap 18 is advantageous insofar as it is simpler to utilize and in particular simpler to fold on a solar generator for the launch of the satellite 10. In the case of flaps 18 folded on a solar generator 14a, 14b and deployed laterally, said flaps are, once deployed, substantially parallel to the rotation axis of the solar generator to which they are connected.

As illustrated in FIGS. 2b and 2c, the flaps 18 of a solar generator are preferably arranged in pairs on either side of the rotation axis of this solar generator, and the inclination is substantially the same for each flap 18 of the device.

In other words, the angles of inclination of each flap 18 have substantially the same value θ. By convention, a value of 0° corresponds to an absence of inclination between a flap 18 and the front face 140 of a solar generator. A positive value corresponds to an inclination towards the rear, a negative value corresponds to an inclination towards the front of the solar generator.

In addition, preferably all the flaps 18 have the same shapes and dimensions, and the flaps 18 are placed substantially at the same distance from an extremity 142 connecting the solar generator 14a, 14b to the central body 12 of the satellite 10. In the non-limiting example represented in FIGS. 2b and 2c, the two solar generators 14a, 14b have substantially the same arrangement, such that the pairs of flaps of the two solar generators 14a and 14b are substantially at the same distance from the body of the satellite 10.

Such an arrangement of flaps 18 in symmetrical pairs makes it possible to better control the attitude of the satellite 10, and to limit any disturbing torques induced by the flaps 18 outside the attitude control phases using the solar pressure. Indeed, if the surfaces 16 are placed in the same optical state, no disturbing torque will be created by the flaps 18, when the Sun's rays are normally incident on the solar generators 14a, 14b. By commanding said surfaces 16 differently, torques may be created around three independent axes.

FIGS. 3a, 3b and 3c schematically represent implementation examples of the flaps 18 so as to obtain torques around three independent axes, in the case of the device illustrated by FIGS. 2a to 2c.

For clarity purposes and in a non-limiting way, it is assumed for simplicity that the Sun's rays are normally incident on the two solar generators 14a and 14b, i.e. that the direction $D_S$ is parallel to the direction of the Sun's rays and orthogonal to the front faces 140 of the solar generators 14a, 14b. In addition, for simplicity it is assumed that each surface 16 whose optical properties can be commanded can take two different optical states: an absorbent state and a reflective state, the norm of a force generated by solar pressure on a surface 16 being greater when said surface is reflective than when it is absorbent.

In FIGS. 3a to 3c, a cross-hatched flap corresponds to a surface whose optical properties can be commanded in the absorbent state; a non-cross-hatched flap corresponds to a surface whose optical properties can be commanded in the reflective state.

In FIGS. 3a to 3c, the flaps of solar generator 14a are designated by first flap 18a and second flap 18b, and the flaps of solar generator 14b are designated by third flap 18c and fourth flap 18d. The first flap 18a and the fourth flap 18d are on the same side of the satellite 10 with respect to the Y rotation axis of the solar generators 14a, 14b, and the second flap 18b and the third flap 18c are on the other side of the satellite 10 with respect to the Y axis (on the right in the figures).

FIG. 3a illustrates the utilization of flaps 18a, 18b, 18c, 18d to create mainly a torque around axis $I_S$. A torque around axis $I_S$ is, for example, obtained by commanding the surfaces 16 such that the first flap 18a and the second flap 18b are placed in a reflective state while the third flap 18c and the fourth flap 18d are placed in an absorbent state. Such a utilization of the flaps tends to produce rotation in the direction of the dashed arrow (the opposite direction being obtained by inversing the absorbent and reflective states of the flaps).

FIG. 3b illustrates the utilization of the flaps 18a, 18b, 18c, 18d to create mainly a torque around an axis parallel to the Y rotation axis of the solar generators 14a, 14b. Such a torque is, for example, obtained by commanding the surfaces 16 such that the first flap 18a and the fourth flap 18d are placed in an absorbent state, while the second flap 18b and the third flap 18c are placed in a reflective state. Such a utilization of the flaps tends to make the satellite rotate in the direction of the dashed arrow (the opposite direction being obtained by inversing the absorbent and reflective states of the flaps).

FIG. 3c illustrates the utilization of the flaps 18a, 18b, 18c, 18d to create mainly a torque around axis $D_S$, known under the name of solar windmill torque. Such a torque is, for example, obtained by commanding the surfaces 16 such that the first flap 18a and the third flap 18c are placed in an absorbent state, while the second flap 18b and the fourth flap 18d are placed in a reflective state. Such a utilization of the flaps tends to make the satellite rotate in the direction of the dashed arrow (the opposite direction being obtained by inversing the absorbent and reflective states of the flaps).

It is therefore understood by reading FIGS. 3a to 3c that the device according to the invention is adapted to create torques around three independent axes without having to de-point the solar generators, which can remain pointed in the direction $D_S$ throughout the attitude control period, avoiding the drop in electrical energy associated to a de-pointing of said solar generators 14a, 14b.

FIGS. 4a, 4b and 4c respectively represent estimates of the torque capacities (i.e. maximum torques that can be created) for axes $I_S$, Y and $D_S$ respectively, designated in these figures by $M_I$, $M_Y$ and $M_D$. These figures show the influence of the value θ of the inclination, the same for all the flaps 18, on the torque capacity of the attitude control device.

In FIGS. 4a to 4c, the surfaces 16 whose optical properties can be commanded are considered to be made of an electrochromic material allowing a transition from a transparent state to an opaque state. In each of these figures, two curves are shown corresponding to the estimated torque capacities for different values of the reflectivity of the opaque state ρ: ρ=0.1 (dashed lines) and ρ=1 (solid lines).

It is noted that the torques around axes $I_S$ and Y are highest when the flaps are not inclined (θ=0°). However, the torque created around axis $D_S$ is then zero. It can also be seen that, for a value θ between 5° and 45°, the torques around axes $I_S$ and Y are not reduced too much compared to those obtained with no inclination, and that it is also possible to create torques around axis $D_S$. As a result, the flaps 18 are preferably inclined, in the operating position, at an angle with a constant value θ between 5° and 45°.

Even more preferably, the flaps 18 are inclined at an angle with a constant value θ between 5° and 20°. Such an inclination makes it possible to boost the torque capacity around axis $I_S$, which is advantageous because the predominant disturbing torques are around axis $I_S$.

For example, in the operating position each flap 18 of the attitude control device has a constant inclination of 15° with respect to the front face 140 of the solar generator 14a, 14b to which it is connected.

These ranges of values can be generalized to other embodiments of the device, including the embodiments wherein the flaps 18 do not all have the same inclination. Indeed, the inclination of the flaps 18 aims mainly at allowing the creation of solar windmill torques without the solar generators 14a, 14b having to be de-pointed, and it has been seen that, in practice, the disturbing solar windmill torques are low with respect to the disturbing torques around axis $I_S$.

Further, it is noted that it is equivalent, from a torque capacity point of view, to consider flaps 18 that are all inclined towards the rear or all inclined towards the front. In the case of a forward inclination of the flaps 18, the inclination will preferably be a constant value θ between −5° and −45° (or even between −5° and −20°).

More generally, and taking the convention adopted for the inclination into account, this is equivalent to a constant inclination with an absolute value between 5° and 45°, preferably between 5° and 20°.

It should be further noted that the torque capacity around the axes $I_S$ and Y increases as the distance of the flaps 18 to these axes increases. It is therefore understood in particular that the flaps 18 are preferably arranged close to a terminal extremity 144 of a solar generator opposite to the extremity 142 connecting this solar generator to the central body 12 of the satellite 10, i.e. closer to said terminal extremity than said connection extremity 142. The flaps 18 are, for example, arranged close to the corners of the solar generators 14a, 14b. In addition, the use of flaps 18 allows the surfaces 16 whose optical properties can be commanded to be positioned farther from the Y axis, which makes it possible to increase the torque capacity compared to surfaces 16 with optical properties arranged on the front faces 140 of the solar generators 14a, 14b.

FIGS. 5a, 5b and 5c schematically represent a preferred embodiment variant of the device, compatible with all the embodiments of said device. In this variant, each surface 16 whose optical properties can be commanded comprises a network of cells 160 whose optical properties can be commanded, and the command module is adapted to command separately each cell whose optical properties can be commanded.

Using a network of cells 160 whose optical properties can be commanded makes it possible to increase the number of possible optical states for each surface 16. It is indeed understood that if a surface 16 comprises N cells whose optical properties can be commanded having two optical states, said surface 16 may be placed in many different optical states (of the order of N+1 optical states).

FIGS. 5a, 5b and 5c schematically represent three embodiments of this variant. In FIGS. 5a and 5b, the network is one-dimensional. In FIG. 5a, the cells 160 are arranged in lines substantially orthogonal to one side of the solar generator 14a. In FIG. 5b, the cells 160 are arranged in columns substantially parallel to one side of the solar generator 14a. In FIG. 5c, the network of cells 160 is a matrix.

In a preferred variant, the surfaces 16 whose optical properties can be commanded are made from an electrochromic material. Such electrochromic materials are considered to be known to the man skilled in the art, and examples of suitable materials are marketed in particular by Eclipse Energy Systems and Ashwin-Ushas Corporation.

Such electrochromic materials have at least two optical states, and a transition from one optical state to another is achieved by applying a suitable electrical stimulus to them. Different types of electrochromic material are available, making it possible to obtain the following transitions in particular:
  Type 1: transition from transparent to absorbent opaque,
  Type 2: transition from transparent to reflective opaque,
  Type 3: transition from absorbent opaque to reflective opaque.

According to some embodiments, some optical states are obtained by combining an electrochromic material with another material. For example, a transition from absorbent opaque to reflective opaque can be obtained by placing a film of Type 1 electrochromic material on a reflective opaque material (aluminum, etc.).

In another preferred variant, the surfaces 16 with optical properties can be commanded mechanically. Preferably, such a surface whose optical properties can be commanded is realized with:
  an element with static optical properties (i.e. substantially fixed over time), said element with static optical properties comprising at least two areas with different static optical properties,
  means of mechanically modifying the optical properties by modifying the respective proportion of each of the at least two areas with different static optical properties in the portion of the element with static optical properties that is exposed to the Sun's rays.

FIGS. 6a, 6b and 6c represent very schematically a preferred embodiment of such surfaces 16 whose optical properties can be mechanically commanded.

In the example illustrated by FIGS. 6a to 6c, the surfaces whose optical properties can be commanded are arranged on lateral flaps 18 that, in the operating position, are fixed with respect to the solar generators. Only one lateral flap 18 is shown in these figures.

In the example illustrated by FIGS. 6a to 6c, the means of mechanically modifying the optical properties mainly comprise two substantially parallel rollers 162a, 162b. The rollers 162a, 162b are mobile in rotation and arranged on two opposite sides of a frame 164. The means of mechanically modifying the optical properties also comprise a means of driving at least one of the rollers in rotation, such as an electric stepping motor (not shown in the figures) commanded by the command module of the device.

The flap 18 further comprises an element with static optical properties mainly constituted of a band 166 surrounding the rollers 162a, 162b, for example a band made of polyimide. One portion of the band 166 is oriented towards the front of the solar generator 14a and is exposed to the Sun's rays, while another portion of said band is oriented towards the rear of the solar generator 14a and is not exposed to the Sun's rays.

The rotation of at least one roller 162a, 162b drives the scrolling of the band 166 according to a scrolling direction D.

The band 166 comprises two areas with different static optical properties, for example a black area (cross-hatched area in FIGS. 6a to 6c) and a white area (not cross-hatched in FIGS. 6a to 6c).

Each area occupies, for example, half of the total surface of the band 166, and preferably extends over the entire width (considered transversally to the scrolling direction D) of said band.

It is therefore understood that the scrolling of the band 166 results in the scrolling of the black and white areas, and varies the proportion of black area and white area in the portion of the band 166 exposed to the Sun's rays. This variation in the black area/white area proportion exposed to the Sun's rays makes it possible to vary the optical properties of the portion of the band 166 exposed to the Sun's rays. It is therefore understood that the surface whose optical properties can be commanded corresponds to the portion of the band 166 exposed to the Sun's rays.

More generally, the surfaces whose optical properties can be commanded can be produced with other types of materials. As another non-limiting example, surfaces whose optical properties can be commanded realized with liquid crystal screens can be cited.

FIG. 7 represents the main steps of a method for commanding a satellite 10 comprising a device according to the invention, which are:
  70 determining an optimum orientation of the front faces 140 of the solar generators 14a, 14b with respect to the Sun,
  72 orienting the front faces 140 of the solar generators 14a, 14b according to the optimum orientation,
  74 determining a torque to be created around three independent axes for controlling the attitude of the satellite 10,
  76 commanding the optical properties of the surfaces 16 whose optical properties can be commanded so as to create the attitude control torques determined in step 74 while keeping the front faces 140 of the solar generators 14a, 14b in their optimum orientation with respect to the Sun.

It should be noted that the optimum orientation set point does not necessarily correspond to a normal incidence of the Sun's rays on the solar generators 14a, 14b.

Indeed, in order to obtain a substantially normal incidence of the Sun's rays on the solar generators, without inclining the satellite 10 with respect to the orbital plane, a mechanism with two rotation axes is required for each solar generator 14a, 14b. Considering solar generators 14a, 14b that are mobile in rotation around a single axis substantially perpendicular to the orbital plane, the optimum orientation corresponds to front faces 140 substantially orthogonal to the direction $D_S$, which is the projection of the satellite/Sun direction in the (X, Z) plane.

In a particular embodiment, the optical properties of the surfaces 16 are modulated over time so as to be able to obtain an optical state corresponding to a weighted mean of the instantaneous optical states available for said surfaces.

For example, for a surface 16 that can take two different reflectivity values $\rho_1$ and $\rho_2$, reflectivity values between $\rho_1$ and $\rho_2$ can be obtained by modifying, during a predefined time interval of duration $T_0$, the durations during which the surface 16 has a reflectivity $\rho_1$ (duration $\tau$) and a reflectivity $\rho_2$ (duration $T_0-\tau$): the mean reflectivity over the interval of duration $T_0$ is then equal to $(\rho_1 \cdot \tau + \rho_2 \cdot (T_0-\tau))/T_0$.

The present invention therefore proposes a device adapted to control the attitude of a satellite 10 around three independent axes, exploiting solar pressure, and not requiring solar generators to be de-pointed with respect to the Sun. This device is used to control the attitude of the satellite 10, i.e. to perform at least one of the following operations:

- continuously compensate fully or partially for disturbing torques induced by solar pressure or other disturbing effects,
- de-saturate reaction wheels accumulating undesirable angular momentum,
- create torques to modify the attitude of the satellite 10.

The invention claimed is:

1. Device for controlling the attitude of a satellite exploiting solar pressure, comprising at least two solar generators arranged on either side of a central body of the satellite, extending along a rotation axis of said solar generators, each solar generator having one face to be exposed to the Sun, referred to as "front face", said device further comprising at least three surfaces whose optical properties can be commanded, wherein said surfaces whose optical properties can be commanded are arranged:

on flaps connected to solar generators, each flap being fixed with respect to the solar generator to which said flap is connected, and
   such that at least two of said surfaces whose optical properties can be commanded are not parallel when the front faces of the solar generators are parallel,
   wherein said device comprises a command module adapted to command separately the optical properties of each surface whose optical properties can be commanded, said command module being configured to command said surfaces whose optical properties can be commanded so as to create torques around three independent axes without de-pointing the solar generators with respect to the Sun.

2. Device according to claim 1, wherein it comprises at least four flaps having substantially flat surfaces whose optical properties can be commanded, each of these surfaces having an inclination with respect to the front face of the solar generator to which said surface is connected.

3. Device according to claim 2, wherein the absolute value of the inclination, between the surface whose optical properties can be commanded of each flap and the front face of the solar generator to which said flap is connected, is between 5° and 20°.

4. Device according to claim 3, wherein the flaps of one pair of flaps of a solar generator are arranged so as to have substantially the same inclination with respect to said solar generator's front face.

5. Device according to claim 1, wherein at least one surface whose optical properties can be commanded comprises an electrochromic material, preferably an electrochromic material that can take at least two optical states.

6. Device according to claim 5, wherein it comprises at least four flaps having substantially flat surfaces whose optical properties can be commanded, each of these surfaces having an inclination with respect to the front face of the solar generator to which said surface is connected.

7. Device according to claim 6, wherein the absolute value of the inclination, between the surface whose optical properties can be commanded of each flap and the front face of the solar generator to which said flap is connected, is between 5° and 20°.

8. Device according to claim 7, wherein the flaps of one pair of flaps of a solar generator are arranged so as to have substantially the same inclination with respect to said solar generator's front face.

9. Device according to claim 1, wherein at least one surface whose optical properties can be commanded comprises a network of several cells whose optical properties can be commanded, the command module being adapted to command separately each cell whose optical properties can be commanded.

10. Device according to claim 1, wherein at least one surface whose optical properties can be commanded is realized with an element having static optical properties, said element with static optical properties comprising at least two areas with different static optical properties, and with means of mechanically modifying the respective proportion of each of the at least two areas with different static optical properties in the portion of the element with static optical properties that is exposed to the Sun's rays.

11. Device according to claim 10, wherein the element with static optical properties is a band, and wherein it comprises at least one roller whose rotation causes the scrolling of the band and the modification of the respective proportion of each of the at least two areas with different static optical properties in the portion of the band exposed to the Sun's rays.

12. Device according to claim 10, wherein it comprises at least four flaps having substantially flat surfaces whose optical properties can be commanded, each of these surfaces having an inclination with respect to the front face of the solar generator to which said surface is connected.

13. Device according to claim 12, wherein the absolute value of the inclination, between the surface whose optical properties can be commanded of each flap and the front face of the solar generator to which said flap is connected, is between 5° and 20°.

14. Device according to claim 13, wherein the flaps of one pair of flaps of a solar generator are arranged so as to have substantially the same inclination with respect to said solar generator's front face.

15. Satellite comprising an attitude control device according to claim 1.

16. Method for commanding a satellite comprising an attitude control device according to claim 1, comprising the following steps:

determining an optimal orientation of the front faces of the solar generators with respect to the Sun,
   orienting the front faces of the solar generators according to the optimal orientation,
   determining a torque to be formed around three independent axes for controlling the attitude of the satellite,
   commanding the optical properties of the surfaces whose optical properties can be commanded so as to form said attitude control torques while keeping the front faces of the solar generators in their optimal orientation.

17. Method according to claim 16, wherein the optical properties of the surfaces are modulated over time so as to obtain an optical state corresponding to a weighted mean of the optical states available for said surfaces.

* * * * *